Figure 1:
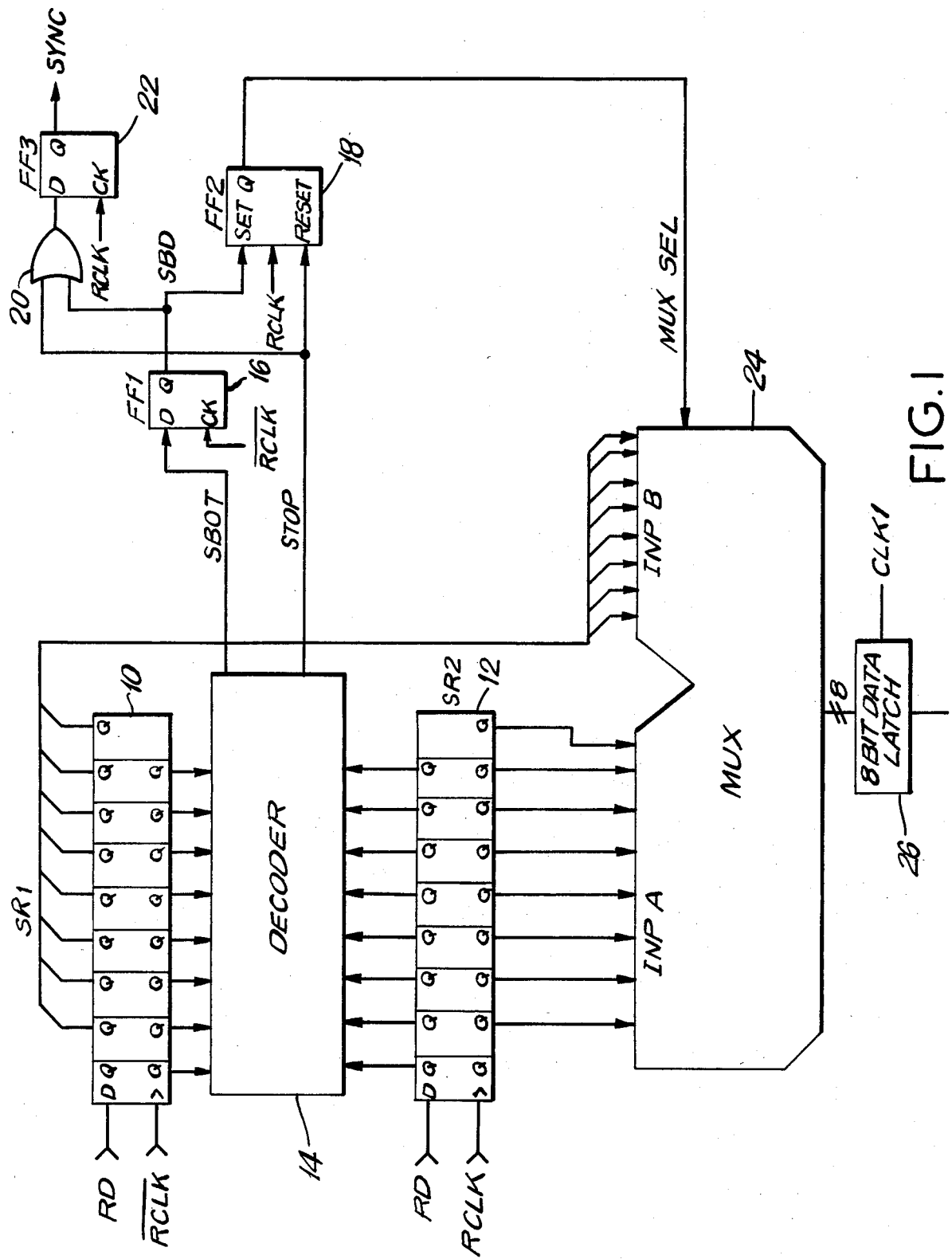

United States Patent [19]

Pechar et al.

[11] Patent Number: 4,625,321
[45] Date of Patent: Nov. 25, 1986

[54] DUAL EDGE CLOCK ADDRESS MARK DETECTOR

[75] Inventors: Henry W. Pechar, Commack; Tak P. Li, Nescomset, both of N.Y.

[73] Assignee: Standard Microsystems Corporation, Hauppauge, N.Y.

[21] Appl. No.: 737,060

[22] Filed: May 23, 1985

[51] Int. Cl.[4] .............................................. H04K 1/02
[52] U.S. Cl. .................................... 375/116; 328/120; 360/51
[58] Field of Search ............... 375/108, 110, 111, 116; 328/72, 120; 371/68; 360/47, 51, 53; 377/28, 39

[56] References Cited

U.S. PATENT DOCUMENTS

| | | | |
|---|---|---|---|
| 3,382,492 | 5/1968 | Santana | 360/51 |
| 4,053,944 | 10/1977 | Dixon | 364/200 |
| 4,072,990 | 2/1978 | Case et al. | 360/78 |

Primary Examiner—Benedict V. Safourek
Assistant Examiner—M. Huseman
Attorney, Agent, or Firm—Hopgood, Calimafde, Kalil, Blaustein & Judlowe

[57] ABSTRACT

A circuit is disclosed for separating clock and data signals from a combined data-clock stream derived from a disk. The circuit includes two memories or shift registers which sample the incoming data at alternate portions of a reference clock. The outputs of the registers are applied to a decoder which identifies which of the two registers contains the data portion and which contains the clock portion with the missing clock pattern. That determination, in turn, controls the generation of the synchronization signal for the circuit and also establishes a control signal that selects data from the other of the registers.

1 Claim, 9 Drawing Figures

FIG.2(a) RCLK
FIG.2(b) SR1 DATA
FIG.2(c) SR2 DATA
FIG.2(d) SBOT
FIG.2(e) SBD
FIG.2(f) STOP
FIG.2(g) MUX SEL
FIG.2(h) SYNC

DUAL EDGE CLOCK ADDRESS MARK DETECTOR

The present invention relates to an improved circuit for deriving clock and data signals from an incoming data stream obtained from a disk or the like.

It is a common practice in the operation of many digital logic circuits to obtain data and timing or clock signals from a disk. When reading frequency-modulated (FM) or modified frequency-modulated (MFM) data from a disk it is necessary to separate the clock and data signals from the incoming data stream coming from the disk.

In a conventional disk data system, the disk provides, in addition to the disk data, a reference clock signal RCLK, which is synchronized to the disk data by the use of a data separator, which may be of the type disclosed in U.S. Pat. No. 4,472,818, such that the disk data is centered within the negative or positive RCLK pulse. In MFM and FM data, the clock is embedded within the data stream so that it is necessary, as noted, to separate the disk data and clock signals.

To achieve this separation of clock and data signal, the clock and data are transmitted according to a special predetermined missing clock pattern (also known as the address mark) in which certain of the clock pulses are missing. This pattern can be viewed as a 16-bit pattern of hexadecimal code with an alternating missing clock portion (OA) and a data portion (A1).

In the known logic systems in which disk data is employed, a single 16-bit shift register connected to a 16-bit decoder searches the incoming data stream for the missing clock pattern and then produces a synchronizing signal which synchronizes the operation of the logic circuit with the incoming data and clock signals. There are, however, several disadvantages associated with this known pattern detector. First, the circuit must internally generate a two-phase clock from the input reference clock to control the operation of the shift register. Second, this clock circuit requires the use of one-shots which are difficult to fabricate at high yields in an MOS fabrication process.

It is a general object of the present invention to provide an improved address mark detector which does away with the requirement of a two-phase clock generator and one-shots.

It is a more general object of the invention to provide an effective and less complex address mark detector, which is more readily fabricated in an MOS integrated circuit.

In the address mark detector of the present invention, a pair of shift registers, each of which may be a 9-bit register, samples the incoming data stream during alternate edges of the incoming reference clock. A detector connected to the stages of the registers detects which of the two registers contains the missing clock pattern and produces an appropriate sync signal and data select signal. The latter signal then transfers data from the other shift register to a data-storing latch. Thus, the same shift registers used to achieve synchronization are also used to read the incoming data so that the two functions of data readout and synchronization are accomplished with shift registers each having a lesser bit capacity than the shift register employed in the known circuits and not utilizing one-shots presently required to perform these functions.

To the accomplishment of the above and such further objects as may hereinafter appear, the present invention relates to an improved address mark detector substantially as defined in the appended claims, and as described in the following detailed specification as considered with the accompanying drawing in which:

FIG. 1 is a schematic block diagram of an address mark detector in accordance with an embodiment of the present invention; and FIGS. 2(a)-(2h) are waveforms of signals employed in the operation of the address mark detector of FIG. 1.

As shown in FIG. 1, the address mark detector of the present invention includes a first shift register 10 (SR1) and a second shift register 12 (SR2), each of which is shown for illustrative purposes as comprising 9 bits. The outputs of each bit stage of shift registers 10, 12 are applied to separate inputs of a decoder 14. The two outputs of the decoder are applied respectively to the data (D) input of a first edge-triggered latch or flip-flop (FF1) 16 and to one input of a NOR gate 20 and to the reset input terminal of a second edge-triggered latch or flip-flop (FF2) 18. The Q terminal output of flip-flop 16 is applied to the other input of NOR gate 20 as well as to the set input terminal of flip-flop 18. The output of NOR gate 20 is applied to the data input of a third edge-triggered latch or flip-flop 22.

The output Q terminal of flip-flop 18 is applied to the control input of a multiplexer (MUX) 24, which receives at one input INPA the output of the shift register 12 and at its other input INPB the outputs of the stages of shift register 10. The output of multiplexer is applied to an 8-bit data latch 26.

In operation, shift registers 10 and 12 each receive the incoming disk data stream RD. In addition, register 10 receives the inverse of the reference clock RCLK (FIG. 2a), whereas register 12 receives the true of the RCLK signal. As a result, shift register 10 samples the incoming data stream RD on the falling edge of RCLK to store SR1 data (FIG. 2b), whereas register 12 samples the input data on the rising edge of RCLK thereby to store SR2 data (FIG. 2c). In other words, the input data is alternatively sampled in shift registers 10, 12 during alternate phases of the reference clock RCLK.

Decoder 14, which is programmed to detect the missing clock OA pattern, receives the serially stored data from the shift registers 10, 12 and compares them with a prestored signal to produce an active or high SBOT signal (FIG. 2d) when it detects the missing clock pattern (OA) in shift register 10, or an active or high STOP (FIG. 2f) when it detects the missing clock pattern in shift register 12.

That is, when a missing clock pattern is detected in either shift register 10 or 12, one of the decoder outputs, SBOT or STOP, as the case may be, will go to a logic 1 level. That signal is also effective to select the appropriate shift register from which to couple its data through the multiplexer to the data latch 26. Thus, for example, if shift register 10 has the missing clock pattern OA and shift register 12 has the data pattern A1, then the decoder output SBOT will go active (logic 1). On the other hand, if shift register 10 has the data pattern A1 and shift register 12 has the missing clock pattern OA, then STOP will go active.

The SBOT signal is applied to the data terminal of latch 16, which also receives the inverse RCLK signal of its clock input. When SBOT goes active or to a logic 1 level flip-flop 16 will be set on the next rising edge of the RCLK clock. The output of latch 16, the SBD signal (FIG. 2e), is applied to the input of NOR gate 20 and the set input of flip-flop 18. The latch 18 also receives the RCLK signal and the STOP signal at its reset input terminal. When the signal STOP goes active, it will set flip-flop 18 on the next (positive) transition of the RCLK clock. The output of flip-flop 18 is the MUX SEL signal (FIG. 2g), which is applied to the control input of the multiplexer 24 to control which set of data outputs, that is, from register 10 or 12, is coupled through the multiplexer to the data latch 26.

The resetting of flip-flop 18 when the STOP signal goes active enables the B input of the multiplexer 24 to be derived from shift register 10. This data, in turn, will get latched in latch 26 as valid disk data during the next byte time. When flip-flop 16 is set upon signal SBOT going active, on the following edge of the RCLK clock, flip-flop 18 is reset and will enable the A input to the multiplexer 24. The purpose of latch 16 is to synchronize the SBOT signal to the rising edge of the RCLK clock.

The NOR gate is used to detect whenever a missing clock pattern is detected and produces a detect signal to the data input of latch 22, which cleans up and delays the detect signal to produce at its output the sync signal (FIG. 2h). The sync signal is used to byte synchronize the entire chip with the incoming data.

Although the present invention has been described with respect to a single embodiment thereof, it is to be understood that modifications may be made therein without necessarily departing from the spirit and scope of the invention.

What is claimed is:

1. An address mark detector comprising an input for receiving a reference clock and an input data stream from an external data source in which the data stream includes an embedded clock in a multi-bit combined data and missing clock pattern, said address mark detector comprising first and second shift registers each having a bit capacity less than the number of bits of said multi-bit pattern, said first and second shift registers comprising means for respectively sampling the incoming data in response to alternate phases of the reference clock and means coupled to the outputs of said first and second shift registers for detecting in which one of said first and second registers the missing clock pattern is contained and for producing a detect signal at the output of that shift register; data storing means, and logic means responsive to said detect signal for passing data from the other of said shift registers to said data storing means.

* * * * *